United States Patent [19]

Rogers et al.

[11] Patent Number: 4,799,115
[45] Date of Patent: Jan. 17, 1989

[54] METHOD AND APPARATUS FOR TOLERATING TRACK MISREGISTRATION SYSTEMS IN TWIN TRACK VERTICAL RECORDING SYSTEMS

[75] Inventors: Lee S. Rogers, Raleigh; Albert W. Vinal, Cary, both of N.C.

[73] Assignee: International Business Machines Corp., Armonk, N.Y.

[21] Appl. No.: 923,778

[22] Filed: Oct. 27, 1986

[51] Int. Cl.$^4$ ............... G11B 5/024; G11B 5/265
[52] U.S. Cl. .............................. 360/66; 360/46; 360/118
[58] Field of Search ............... 360/46, 66, 113, 118

[56] References Cited

U.S. PATENT DOCUMENTS

| | | | |
|---|---|---|---|
| 2,857,585 | 10/1958 | Dickinson | 360/46 |
| 3,859,664 | 1/1975 | Chynoweth et al. | 360/118 |
| 3,882,544 | 5/1975 | Hughes | 360/118 |
| 4,484,238 | 11/1984 | Vinal | 360/47 |
| 4,626,946 | 12/1986 | Vinal | 360/113 |
| 4,644,421 | 2/1987 | Miwa et al. | 360/66 |
| 4,698,711 | 10/1987 | Vinal | 360/113 |

FOREIGN PATENT DOCUMENTS 0137922  4/1985  European Pat. Off. ............ 360/118

*Primary Examiner*—Alan Faber
*Assistant Examiner*—Surinder Sachar
*Attorney, Agent, or Firm*—Edward H. Duffield

[57] ABSTRACT

Track misregistration between a read-back head and a previously recorded pair of tracks can cause erroneous data to be detected by the read head. It has been discovered that a prior erasure to eliminate any residual magnetization reversals occurring between and along side of the two parallel data tracks in twin track vertical recording can unexpectedly increase track misregistration tolerance by several hundreds of percents over the tolerance exhibited by twin track vertical recording having no pre-write erasure in the space between tracks and along side of the tracks. The erase before write technique may be practiced with a new read-write head structure having an E-shaped erase core aligned with the twin track read-write head and insulated from it to precede the read-write structure in the direction of relative motion between the read-write head structure and the magnetic medium.

2 Claims, 7 Drawing Sheets

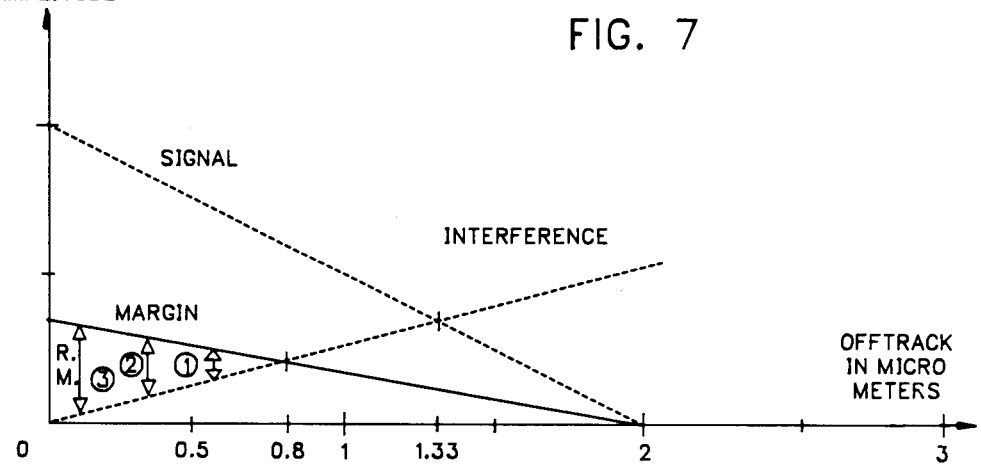
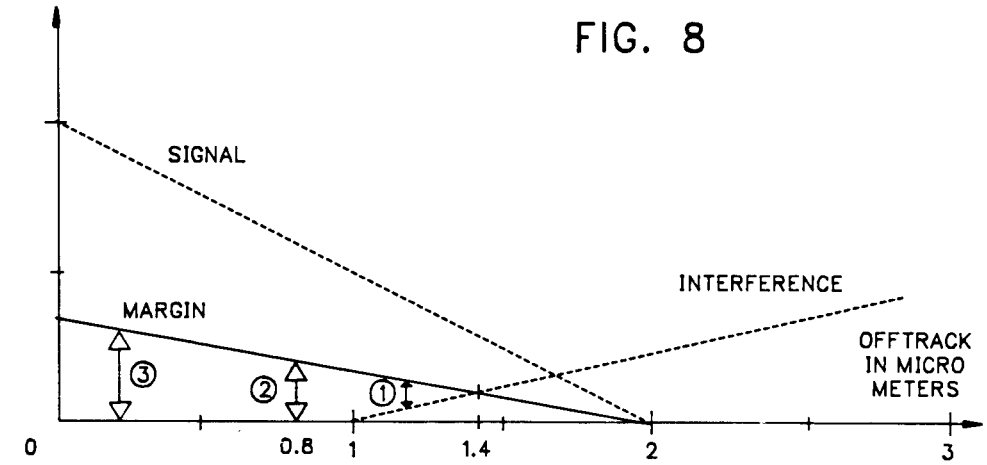

METHOD AND APPARATUS FOR TOLERATING TRACK MISREGISTRATION SYSTEMS IN TWIN TRACK VERTICAL RECORDING SYSTEMS

RELATED APPLICATIONS

This application is related to my own commonly assigned and issued U.S. Pat. No. 4,484,238 which shows the generic twin track data recording method. It is also related to my own commonly assigned and co-pending U.S. patent application Ser. No. 584,364, filed 2-28-84, now U.S. Pat. No. 4,626,946, issued Dec. 2, 1986, which shows a twin track vertical read-write head structure useful in producing twin track vertical recordings of the sort in the aforementioned patent. It is also related to my commonly assigned co-pending patent application Ser. No. 782,661, filed 10-2-85, showing a modified twin track read-write head structure incorporating pole tip shields. It is further related to my own commonly assigned and co-pending patent application Ser. No. 782,660, filed 10-2-85, now U.S. Pat. No. 4,698,711, issued Oct. 6, 1987, which shows a differential twin track read-write head and servo system.

FIELD OF THE INVENTION

This invention relates to magnetic data reading and writing methods and apparatus in general and specifically to twin track reading and writing systems such as shown in my own commonly assigned U.S. Pat. No. 4,484,238, and in particular to methods and apparatus for improving track misregistration tolerance during read-back of signals in such system.

PRIOR ART

Many factors affect the tracking position of a read-write head during both reading and writing on magnetic disk mediums. It is ideally desired that the read-write head be positioned exactly on the track position for each revolution of the disk during both the read and the write modes of operation. When such perfect track registration is attained, the signal amplitude of the desired data read-back is at a maximum. In such conditions, any newly written data will also occupy the exact same track region as did the old data which it replaces. However, in practical operating systems, the read-write head is very rarely aligned perfectly with the data track that exists. This gives rise to the phenomenon of track misregistration. Track misregistration is the result of many factors such as mechanical vibration, disk eccentricity or run-out, bearing eccentricity and run-out, servo system tracking errors and detection errors and the like. Erroneous data can be detected by the read head when significant track misregistration occurs.

In conventional longitudinal recording schemes for disk medium systems, inductive head designs permit writing tracks that may be 1½ times the width of the read-back structure. By writing the data tracks widely, mechanical variations in tracking during read-back may be accommodated. The wider written track permits old and new written data to exist within the full width of the expanded data track and writes over and effectively erases any old data. The width of the read-back head is narrow so as to allow only the new data to be read back within the given limits of the track misregistration. While this system is applicable in fairly low density recording where the number of tracks per inch lie below 2,000, as higher areal densities are achieved and the resultant number of tracks per inch increases, solid state sensor read-write head designs will be required that may not readily permit the practice of writing wide and reading in a narrow path as used previously. This is particularly true for twin track read-write head structures.

OBJECTS OF THE INVENTION

As a consequence of the difficulties in the known prior art, it is an object of the invention to provide an improved method of increasing track misregistration tolerance in twin track vertical recording read-write systems.

It is yet another object of the present invention to provide improved twin track read-write recording apparatus that employs an erase-before-write structure and technique.

Yet another object of the invention is to provide an improved twin track vertical recording read-write head structure with an integral side and center track erase structure.

SUMMARY

The foregoing and still other objects of the invention not specifically enumerated are met utilizing a twin track read-write head structure having an integrally formed E-shaped erase pole structure which is electrically and magnetically independent of the read-write head portion. The width of the end faces of the E-shaped erase structure is chosen such that a path on either side of each of the twin tracks of data recording provided by the read-write head structure is swept out or erased by the outer most pole tips of the E-shaped erase structure. The central leg of the E-shaped erase structure erases the central area between the two data tracks. Erasing the central area between the data tracks and extending erasure on the opposite side of each data track from the edge of the track outwards to a distance of at least ¼ the width of the data track, greatly increases track misregistration tolerance in twin track read-write systems by eliminating interference signal components during read-back that come from misregistered writing of old tracks'data. In addition, the width of the pole tips of the read-write head structure for the twin track read-write elements may be increased to preserve the maximum amount of read-back signal amplitude during excursions of the read-write head off-track.

BRIEF DESCRIPTION OF THE DRAWINGS

The present invention will be described with reference to a preferred embodiment thereof better shown and illustrated in the drawings in which:

FIG. 7 illustrates graphically the read-write head output signal amplitude during read-back as a function of off-track excursion in a twin track read head having exemplary two micron wide read-write head poles, a two micron wide space between data tracks with erasure between the two data tracks alone.

FIG. 8 illustrates the signal output amplitude for twin track read-write head having two micron wide read-write pole widths, a two micron wide space between poles with erasure between the data tracks and an additional one micron wide erasure on either side of each data track.

DETAILED SPECIFICATION

Figure 1A:
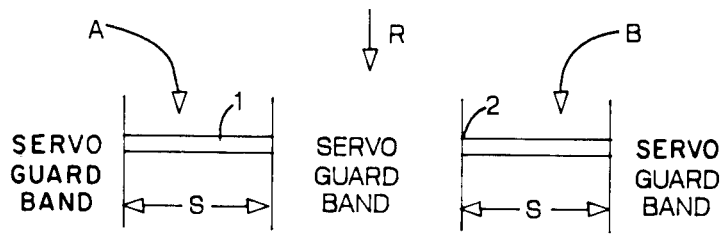
FIGS. 1A through 1D illustrate schematic plan views of segments of twin track recorded media showing superimposed thereon the position of a twin track read-write head during its excursion in track misregistration back and forth across the desired track position on the medium.

The invention will now be described with reference to several preferred embodiments as illustrated in the drawings. The need for the improved recording techniques and head structures to be described is best appreciated by examining the effects of track misregistration utilizing a shielded twin track head design having no erasure between or on either side of recorded data tracks. A description of this system appears in FIG. 1 which comprises FIGS. 1A through 1D as illustrated. The figures assume that one is viewing a segment of twin recorded data tracks, each having a width S existing on a magnetic medium such as a recording disk surface. The width of the twin track read-write pole tips is shown as W and normally generates a recorded data track of width S equal to W. The area on the left of the left-most data track and to the right of the right-most data track is recorded with a constant DC magnetic polarity, i.e., all north or all south with north and south directions being interleaved and alternated such that the areas outside of each data track may be north or south, but the area between the data tracks will then be south or north, respectively. Such a recording aids in servo control as defined by my own aforementioned patent application, Ser. No. 782,660. However, for purposes of the present discussion, these servo or guard band zones on the data medium may be treated simply as intervening areas between the data tracks which ordinarily should not contain recorded data signals.

FIG. 1A illustrates the perfect system or the ideal system in which the read-write head pole tips 1 and 2 having a width W are precisely registered with the data tracks A and B so that the width W of each pole tip 1 and 2 exactly coincides with the width S of each data track. The magnetic medium motion relative to the read-write head pole tips 1 and 2 is in the direction of the arrow labeled R for relative motion. The direction R is arbitrary and may be up or down in Figure 1A, but is understood in twin track vertical recording to mean that relative motion between the medium and the read-write head structure occurs in the line perpendicular with the long axis of each pole tip 1 and 2.

Figure 1B:
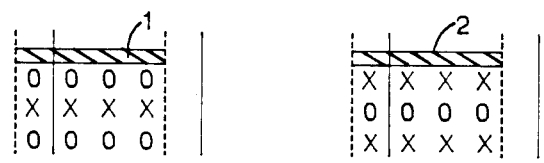
Figure 1C:
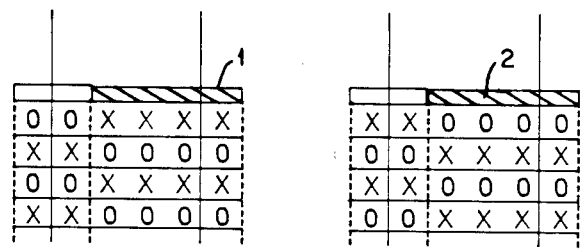

FIG. 1B illustrates the condition where the read-write pole tips 1 and 2 have experienced a leftward excursion off of the desired track positions S for tracks A and B by a distance of ¼ of track width S during a recording operation. It will be understood that in twin track recording a pole tip 1 may be recording a north pole and at the same instant the pole tip 2 will be recording a south pole and vice versa in twin track vertical data recording techniques as described in my aforementioned patent. Accordingly, the polarities of the re-corded segments of data tracks A and B are opposite and are indicated in FIG. 1B by Os and Xs in co-aligned segments of each data track A and B. It will be observed that a polarity pattern will exist outside of the desired track position A and B when the read-write head has experienced an off-track excursion to the left as shown in FIG. 1B. FIG. 1C illustrates a similar excursion to the right of the desired track A and B positions by a similar distance of ¼ the track width S. Magnetic writing in this position will create a small portion of recorded data outside of the desired A and B track location as shown in FIG. 1C.

Figure 1D:
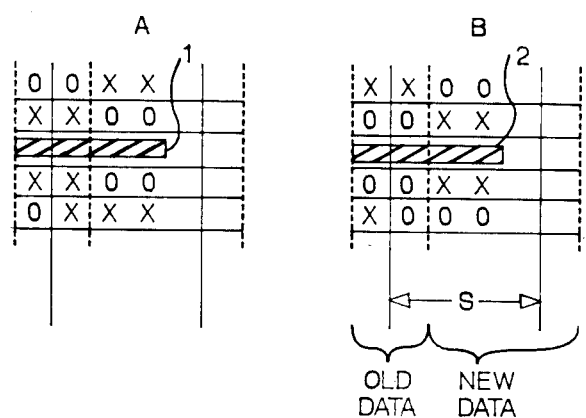

The condition during read-back is illustrated in FIG. 1D in which the read-write pole tips 1 and 2 are now shown arbitrarily experiencing an excursion of ¼ of the track width S to the left of the desired track location. It will be observed that pole tip 1 will effectively be exposed to north written poles or south written poles on ½ of its width and with the opposite polarity poles on the other half of its width and will produce an unintelligible signal. This is due to the interference of the off-track written data from FIG. 1B that is left over and was not eliminated by the off-track rewriting of new data in FIG. 1C. The old data now interferes with the desired data which was attempted to be written in FIG. 1C and which was written but exists only under the right-hand half of each of the pole tips 1 and 2 in FIG. 1D. It will be observed from FIGS. 1A through 1D that the old data residue presents a problem during data read-back intervals and may actually create an unintelligible read-back if an off-track excursion of ¼ of the track width S occurs.

Figure 2:
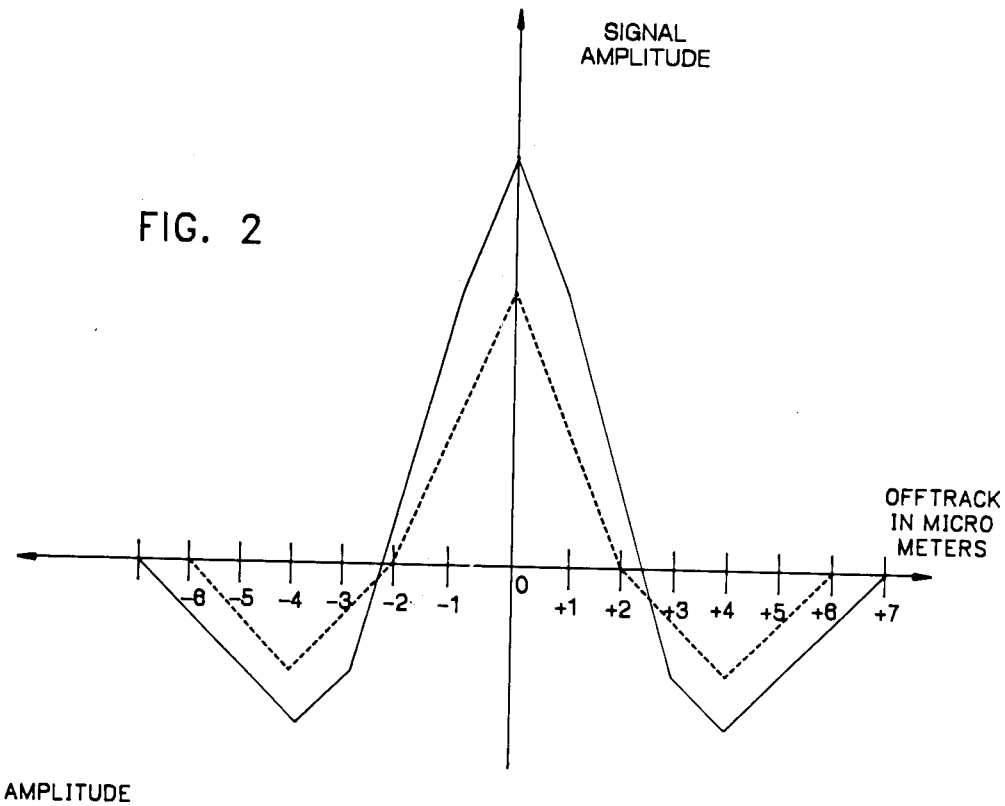
FIG. 2 illustrates schematically the signal amplitude output as a function of misregistration distance off of the desired center track perfect registration condition.

FIG. 2 graphically illustrates the signal amplitude as a function of off-track distance in micrometers (micron) left or right of the center track position identified as the 0 in the axis intersection in FIG. 2. Two conditions are illustrated. The dashed line illustrates the condition of a magnetic read-write head having two micron wide poles 1 and 2 and a two micron space between the poles. This corresponds to the central servo guard band track area in FIG. 1A between the pole tips 1 and 2. It will be observed that when the pole tips are exactly on track, i.e., there is zero excursion to the left or the right, the maximum signal amplitude exists in FIG. 2. As the read-write head wanders left or right of the recorded data track position, the signal amplitude will fall and at a position two microns to the left or right of the desired central position will reach zero assuming that no spurious signals exist on either side of the recorded data tracks. FIG. 2 also illustrates (in solid lines) another example in which a three micron wide read-write pole tip for the pole tips 1 and 2 is selected with a one micron space between pole tips. This has a somewhat higher initial signal amplitude exactly on track due to the greater width of recorded information underneath the head pole tips. However, at a position of one micron off center either left or right, one or the other of the pole tips 1 and 2 will begin to ride over the adjacent data track. The data there being out of phase with what remains on the first track will decrease the intelligible signal amplitude at an even greater rate. As is apparent from FIG. 2, in conventional twin track data recording, an only half-intelligible signal will occur with a track misregistration of only ¼ of the usual data track width excursion to the left or right of the recorded tracks. The example shown in FIG. 2 assumes two micron wide tracks and a two micron wide space in one example so that a ¼ micron excursion will produce only a half-intelligible and a ½ micron excursion will produce a totally unintelligible signal under the worst conditions as depicted in FIG. 1D. It should be realized that FIG. 2 is the idealized figure with no off-track interference signals from previously recorded off-track information. Where practical or non-ideal situations apply, the effect of previously recorded old information off-track combined with off-track read-back excursions can create non-intelligibility with only a ¼ track width off-track excursion as shown in FIGS. 1A through 1D. The combined effects are somewhat statistical in nature since, in not all cases, will the off-track signal contribution be out of phase and cause unintelligibility. However, the combined effect may be seen in FIG. 3.

Figure 3:
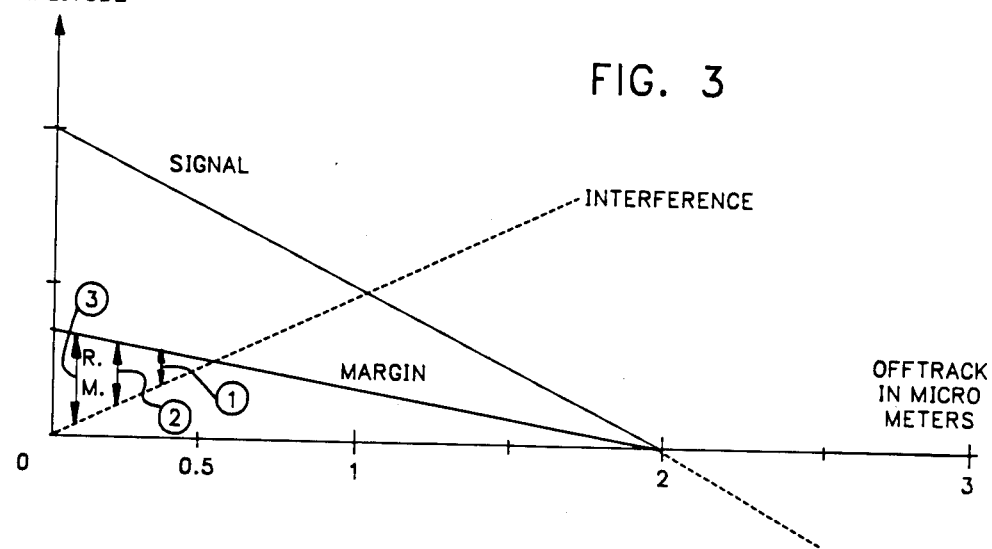
FIG. 3 illustrates a graphical analysis of the read-write head signal output as a function of the distance of misregistration between the read-back head and the recorded tracks and also illustrates the increase in off-track interference signal level and the effects of sensing margin necessary for error protection in a read-back system.

FIG. 3 illustrates a graphical depiction of signal readback amplitude on the ordinate versus off-track distance in microns on the absisca. The assumed conditions are a twin track read-write head having two micron wide pole tips with a two micron wide space between them without erasure and with the existing possible off-track signal recorded information as shown in FIGS. 1A through 1D. Under these circumstances, the output signal of the hypothetical perfect head falls, as shown by the signal line in FIG. 3, while the off-track interference signal contribution rises as shown by the interference signal line at an equal rate to that to which the signal falls. At a distance of one micron off-track, the contribution from off-track signal interference equals that of the on track signal and we have a mathematical failure position. However, due to the statistical nature of the data that may be written off-track and to the various effects of signal processing in the read-back signal circuits, different amplifier gains and the like, it is possible as shown in FIG. 1D for properly phased off-track signals to cancel or equal the on track components with an excursion of only ¼ the track width or ½ micron for a two micron wide track under certain circumstances. This introduces a concept of a margin amplitude which is depicted in FIG. 3. It will be observed that the level of possible non-intelligibility is crossed with a margin signal level that is lower than the mathematical interference level point at one micron and is reached at only ½ micron off-track. Signals in the range between ½ micron and one micron off-track are of questionable accuracy and to be completely certain that properly phased and identified signals are found, the point labeled with a circle 2 to the left of the margin and interference failure point at ½ micron in FIG. 3 is the actual usable signal portion and occurs at only about 2/10 of a micron off-track for these assumed conditions. Contributions from general electronic noise known as "shot" noise from amplifiers and components in the read-back system and from externally generated interference have not been shown but would reduce further the usable level of signal.

It is evident that the track misregistration tolerance is a substantial factor in the intelligibility of the read-back data. The contribution of off-track interference can be removed or substantially reduced by erasing the off-track portions of the magnetic medium before new data is written. This will be described in greater detail later with illustrative examples given.

Figure 4:
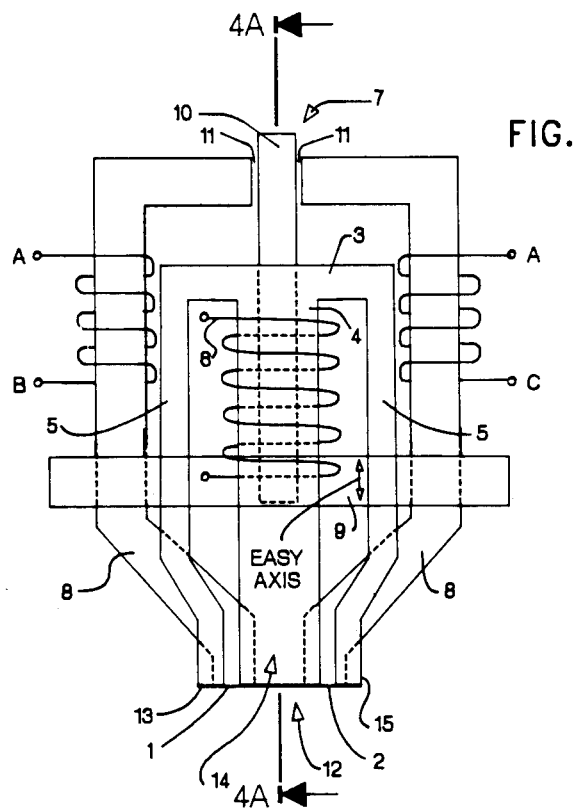
FIG. 4 illustrates schematically a horizontal elevation of a twin track differential read-write head structure having superimposed thereon an E-shaped erase core structure.

The present invention utilizes an E-shaped monolithically formed erase core structure as shown in FIG. 4. FIG. 4 shows the erase core structure 3 in a general schematic form having a central leg 4 and two outer legs 5 which are integrally formed. A coil 6 is wrapped about the center leg and current from a source not shown may be applied to energize the legs 5 and the central leg 4. Pole tips 1 and 2 are the tips of a twin track read-write head structure 7 similar to that in my aforementioned co-pending application Ser. No. 782,660, but any of a variety of designs for twin track read-write head structures may be utilized. The read-write head structure 7 comprises coupling legs 8 which connect the pole tips 1 and 2 to either end of a coupled film magneto resistive sensor 9. The central leg 10 closes the flux return path from pole tips 1 and 2 through the sensor 9 and back through the gaps 11. Details of the sensor 9 and of the twin track read-write head structure itself are not given other than to note that there is a gap 12 between the pole tips 1 and 2 which corresponds to the central gap between two recorded data tracks A and B such as shown in FIGS. 1A-1D. The width of the pole tips 1 and 2 establishes the width of the written data track in these figures.

The tips of the E core member are labeled 13, 14 and 15, respectively, and are shown to partially extend beyond the edges of the pole tips 1 and 2 and the edges of the pole tips 1 and 2 in the central area 12. The E-shaped core structure 3 will be electrically and magnetically isolated and insulated from the twin track read-write head structure which it overlies, but it must be in overlapping registration with the pole tips 1 and 2 thereof as shown in FIG. 4. The degree of extension of the pole tips 13–15 beyond the edges of the pole tips 1 and 2 of the read-write head structure in the paths that they sweep out on the surface of the recording medium represents the degree of side track and central area erasing to be performed.

Figure 4A:
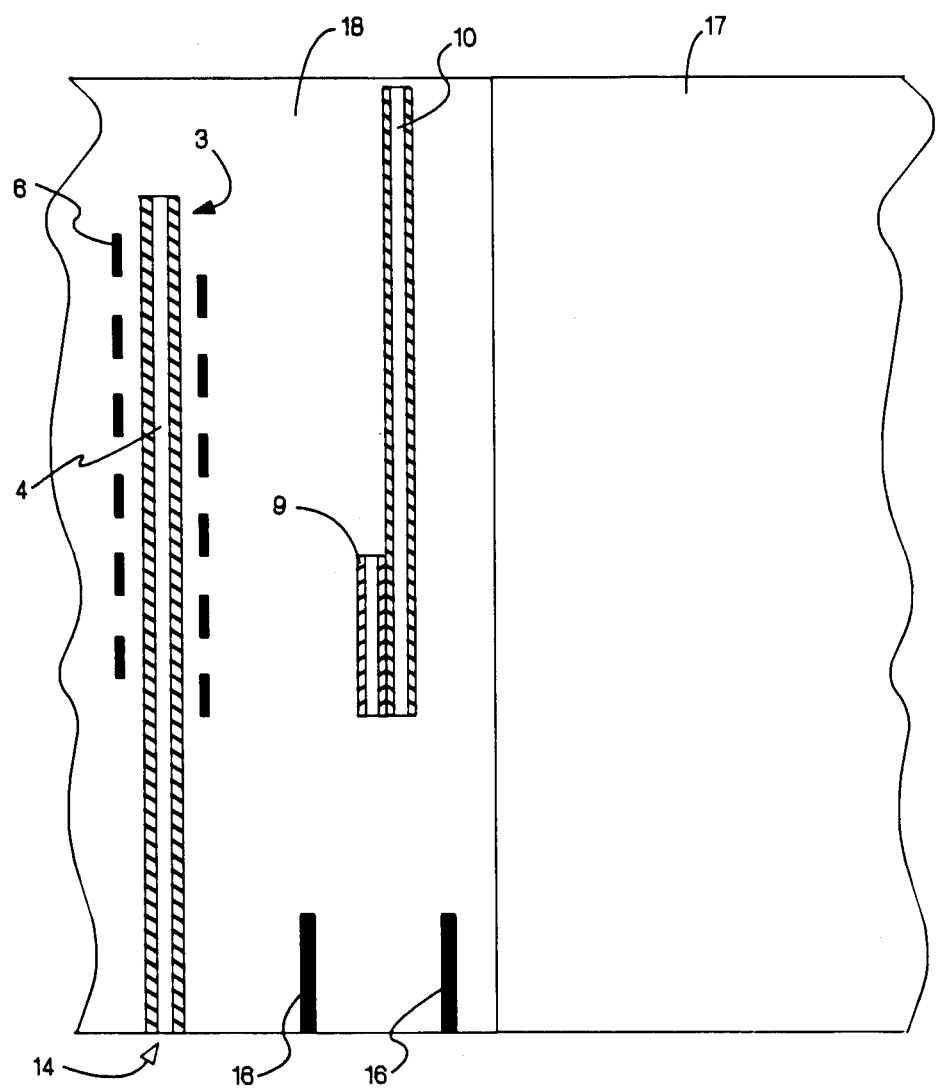
FIG. 4A illustrates longitudinal cross section through the center line of the structure in FIG. 4.

FIG. 4A is a vertical cross sectional view taken through the structure in FIG. 4 and illustrates the additional permalloy shield elements 16, not illustrated in FIG. 4, but which may be employed as described in my aforementioned co-pending patent application Ser. No. 782,661, now U.S. Pat. No. 4,698,711, to eliminate coupling from adjacent bit positions on the magnetic medium to the pole tips 1 and 2. In FIG. 4A, the magnetic medium is not shown but would confront the bottom edge 14 of the pole tips of the E-shaped erase structure 3. It will be observed that the E-shaped erase structure is isolated from the read-write magnetic head members 9 and 10 by a distance of approximately four microns where two micron wide pole tips 1 and 2 (not shown in FIG. 4A due to the cross section involved) are utilized. The preferred flux guide members forming the legs 5 and 4 in the E-shaped core member are a laminate or sandwich of nickel iron film with a central non-magnetic conductor such as aluminum, titanium or copper which prevents exchange coupling between the layers of nickel iron film in legs 4 and 5 and reduces noise in reading and writing. The flux conductor 10 which is part of the read-write head is also the same structure as is the coupled film magneto resistive sensor 9 shown in cross section in FIG. 4A. The entire series of read-write head elements and the erase structure and erase coil are imbedded in silicon dioxide glass applied to the end face of a ceramic slider for a magnetic head that might typically be made of ferrite if flux coupling back to the medium (not shown) is desired.

To fabricate this structure, a first layer of silicon dioxide would be laid down on the end face of the slider 17 followed by deposition of the magnetically permeable pole tip shield 16 shown on the right in FIG. 4A followed by more silicon dioxide and then the magnetic flux guide legs 8 and 10 and a metalization series of layers for the coupled film magneto resistive sensor 9 followed by still more silicon dioxide and then another magnetically permeable pole tip shield 16 shown on the left in FIG. 4A. This will be followed by still more silicon dioxide glass insulator and then the first layer of coil half portions for coil 6 for the erase core structure 3 followed by more silicon dioxide and deposition of the metallic layers for the erase core legs 4 and 5 with a further layer of silicon dioxide and the remaining portion of the coil half 6 followed by a final insulative layer of silicon dioxide. This manner of construction is well known to those in the semiconductor industry and will not be detailed further since the method of manufacture is not particularly pertinent to the generic structure as shown.

Figure 5:
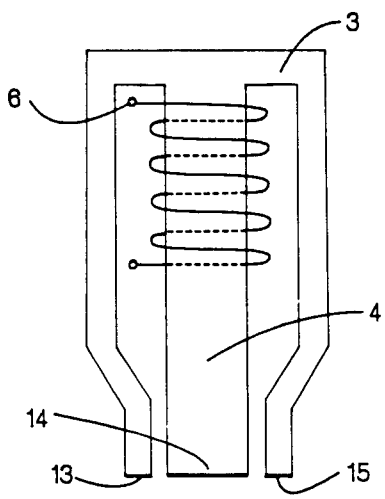
FIG. 5 illustrates the E core erase structure in isolation in a horizontal elevation view.

The structure of the E-shaped erase core itself in isolation is shown in plan view in FIG. 5 which also illustrates how the magnetic flux passes through the core elements.

Figure 6A:
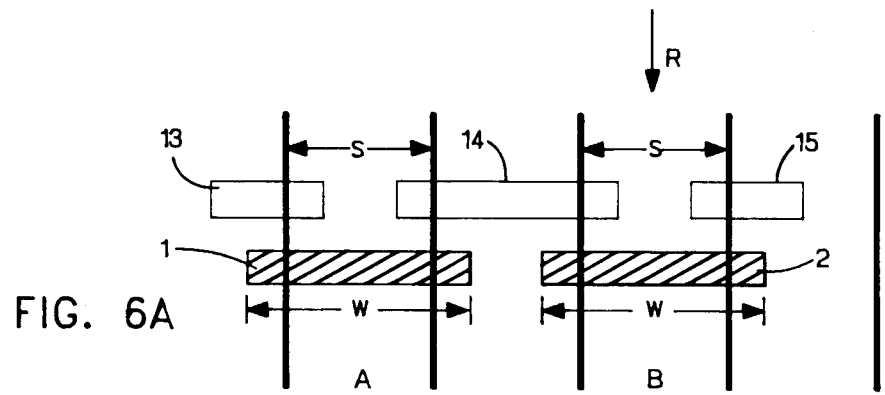
FIGS. 6A through 6C illustrate schematically the operation of the combined twin track read-write head structure with the E-shaped erase core structure in an erase-before-write recording technique as a function of read-write head excursions off-track.
Figure 6B:
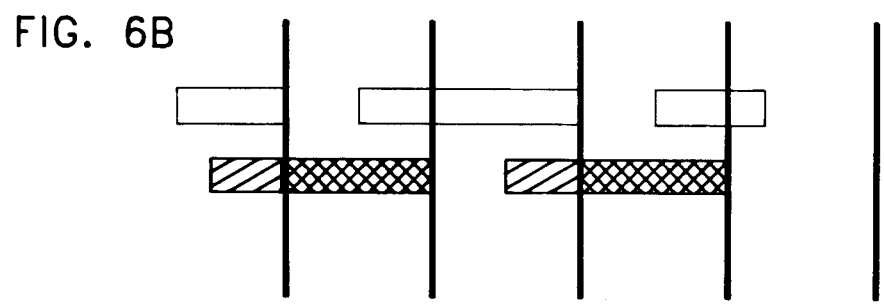
Figure 6C:
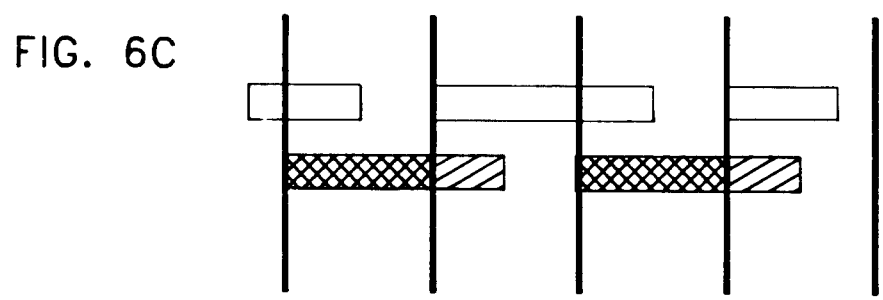

The method of employment of the head structure as shown in the foregoing FIGS. 4 and 4A is illustrated in FIGS. 6A-6C. FIGS. 6A-6C are similar to FIGS. 1A-1D and illustrate schematically a footprint of the ends of the pole tips 1 and 2, the magnetic twin track vertical read-write head superimposed on hypothetical track areas S on a magnetic medium moving in the direction of the arrow R for relative motion and illustrating schematically the position of the ends of the pole tips 13, 14 and 15 of the E-shaped erase core. The width W of the pole tips 1 and 2 has been increased from two microns in the example given relative to FIGS. 1 and 2 and 3 to three microns with only a one micron gap or space between the pole tips 1 and 2. This increases the width of the pole tips and maintains at least a portion of the pole tip in registration over the recorded central area of tracks A and B for longer time during excursions of the read-write head to the left or the right. This, as will be readily understood, maintains a higher signal amplitude output for a longer period of time or during a greater excursion as compared to that that would be provided by narrower pole tips.

In FIGS. 6A-6B the magnetic medium is taken as moving from the top of the picture in the direction R to show that the erasing structure elements precede the write structure elements in order of presentation to areas of the magnetic medium. The parallel vertical lines illustrate the track positions for the nominal width of the data track pairs A and B in the twin track recording in accordance with my aforementioned patent. It is apparent that the read-write head pole tips are wide enough to fully write the entire width S of tracks A and B while the magnetic read-write head is exactly on track center. In addition, the width has been increased sufficiently so that during an excursion to the left or the right of ¼ of the track width S enough read-write head pole tip 1 or 2 will still remain to fully write the entire width A or B, respectively. Thus, that part of the medium which may not be erased due to the space between the pole tips 13, 14 or 14, 15 will be completely overwritten by fields produced by the read-write pole tips 1 and 2. The erase structure will be energized during the entire writing phase so that it will sweep out at its pole tips 13, 14 and 15 erased areas of magnetic medium prior to recording by the read-write head tips 1 and 2. In an excursion to the left as shown in FIG. 6B or to the right as shown in FIG. 6C, the magnetic read-write head pole tips 1 and 2 will still overlie the full width A and B of the recorded tracks and the remainder of the pole tip portion will lie over an erased part of the intervening track to track space that was swept out by either pole tips 13 or 15 with no signal interference in the zone outside of the track width S in tracks A or B so long as the total excursion does not exceed one micron to the left or right.

The effect of the intertrack erasure alone can be separately examined as shown in FIG. 7. This figure, like FIG. 3 earlier, shows the contribution of the interference signal. In the example shown in FIG. 7, it is assumed that erasure between the pole tips 1 and 2 occurs but that no side erasure has been provided. Thus, as the read-write head slides off-track to the left or right, some contribution of unerased old data lying beside the track A or B will give rise to interference as shown in FIG. 7. The effective margin is increased from that shown in FIG. 3 because the interference increases at a lower rate. Because of this, the crossover point of margin and interference, the critical level for data detection, is increased from the ½ micron off-track distance shown in FIG. 3 to 0.8 micron off-track distance, a 60% increase. Note also that the circled point 2 for safe reading is also increased above the previous value of 0.2 microns to approximately 0.3 microns, also a 60% increase.

FIG. 8 is a graph showing the effect for two-micron wide pole tips 1 and 2 with a two micron space between them having erasure between the poles and an additional side erasure of one micron on each side left and right beyond the edges of pole tips 1 and 2. It may now be noted that no interference will be obtained until the head is at least one micron off-track and then, when the head does go over into interference patterns, it will only be under one pole of the head so the amplitude of interference rises at only ½ the rate. The crossover point between interference and margin is now out to 1.4 microns, a 75% increase over the FIG. 7 case and a 180% increase over that of a head having no erasure. The circle 2 point which is the critical point for remaining margin to detect data is also moved out to 0.8 microns which is 400% of that for the original twin track head without erasure, a substantial and unexpected improvement.

Figure 9:
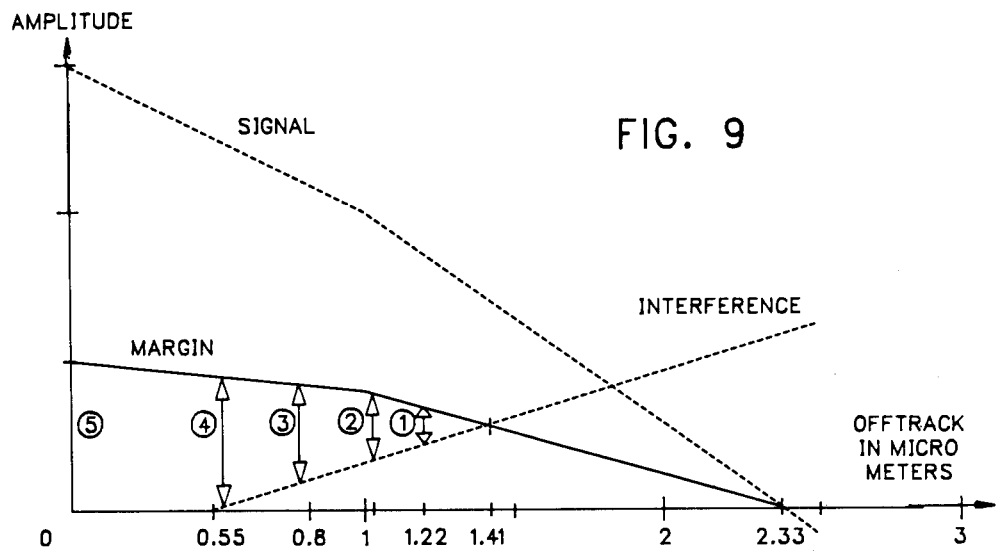
FIG. 9 illustrates the signal amplitude output of a twin track read-write head having three micron wide pole tips for the read-write head structure, a one micron space between the poles and a ½ micron erasure on the side of each data track.

FIG. 9 shows the condition for a head similar to that depicted in FIGS. 4 and 4A having three micron wide pole tips 1 and 2, a one micron wide space between the poles with erasure in this space and a side erasure of ½ micron past each of the side poles. The crossover point between margin and interference is now out to 1.41 microns but the signal to noise increases more rapidly as the head reaches the fully on track condition due to the wider pole tips 1 and 2. Thus, the circle 2 point is approximately out at about 1.03 microns compared to the previous case in FIG. 8 of only 0.8 microns. This is a 415% increase over the original twin track head without erasure.

Figure 10:
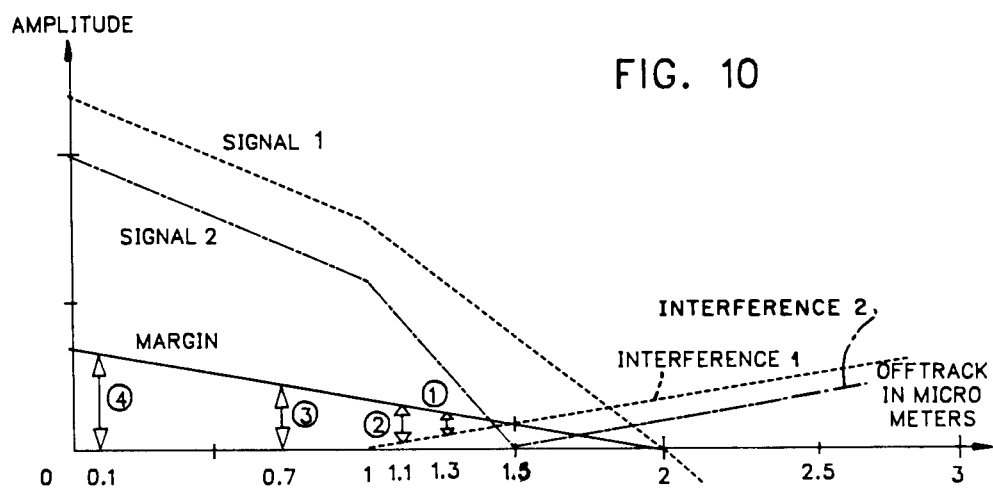
FIG. 10 illustrates a similar graph to FIGS. 8–10 but with the read-write pole tips being 2½ microns wide with a one micron space between with erasure between the data tracks and erasure for one micron on either side of each data track. This figure also illustrates the effect of narrowing the read-write pole tips and increasing the erasure on the outside of each recorded data track.

FIG. 10 illustrates another set of variations in which the head having pole tips of 2½ microns wide with a one micron wide space between with erasure between the poles and erasure continuing one micron past the poles on each side of the data track being assumed. In this example, (using dashed lines) the interference point is moved out to 1.5 microns and the circle 2 point for accurate reading of data within the margin is moved out to 1.1 microns, which is 7½ times or 750% of the original value for the twin track heads without erasure. The on-track signal is also 1.5 times the original on track signal and represents a substantial improvement over the original head design without erasure. Also shown in FIG. 10 (using dash-dot lines) is an alternative assuming two micron wide pole tips, a one micron wide space and an erasure of 1½ microns past the pole tips on either side. This is seen to reduce the signal output level somewhat, but it moves the interference crossover point completely beyond where the signal and margin crossover point occurs. In other words, no off-track interference signal will be encountered up to and including the usual portion of a margin of signal.

It may be seen from the foregoing discussion that a variety of permutations of pole tip widths and erasure widths may be employed in the invention, all of which lead to substantial improvement in the overall read-back signal performance and margin available for accurate detection. While the width of the read-write head pole tips may be varied somewhat to improve the level of overall signal read-back for output, it is the width of the side and central erasure that is important in reducing the interference signal level. At a minimum, side erasure of at least ¼ the width of the data track is preferred and a central region erasure of the full width of the central region between data tracks is desired. Therefore, a wide variety of permutations of pole tip widths, spacings and erasure overlap may be envisioned, all falling within the general scope and intentment of this invention wherefor what is described in the claims which follow is intended by way of description and not by way of limitation.

What is claimed is:

1. An improved twin track magnetic data read-write head apparatus, comprising:

a twin track magnetic writing structure having two magnetically linked and magnetically permeable flux conductive legs, said legs being provided with a means of magnetic flux energization for writing data on a magnetic recording medium;

portions of said legs being positioned adjacent to said medium to magnetically write thereon, said portions of said legs having projected areas of exposure adjacent said medium which lie in two parallel recording paths on said medium, each said area having its longest dimension arranged colinear with the other and perpendicular to the longest axis of the desired recording path on said medium; and an E-shaped magnetically permeable erase member having means for energizing said member with magnetic flux to generate erasure of said medium;

said E-shaped member being mounted in electrical and magnetic isolation from said magnetic writing structure and mounted commonly therewith to precede said magnetic writing structure along said recording paths on said medium, said E-shaped magnetically permeable member being arranged to have projections of its leg areas upon said magnetic medium lying adjacent to each side of each of said recording paths thereon.

2. Apparatus as described in claim 1, further comprising:

a portion of said E-shaped magnetically permeable erase member having a leg area projection on said magnetic member lying between said data paths thereon.

* * * * *